US011163888B2

(12) United States Patent
Kagalavadi Ramesh et al.

(10) Patent No.: US 11,163,888 B2
(45) Date of Patent: Nov. 2, 2021

(54) DETECTING SECOND-ORDER SECURITY VULNERABILITIES VIA MODELLING INFORMATION FLOW THROUGH PERSISTENT STORAGE

(71) Applicant: Oracle International Corporation, Redwood Shores, CA (US)

(72) Inventors: Raghavendra Kagalavadi Ramesh, Brisbane (AU); Padmanabhan Krishnan, Brisbane (AU); Yi Lu, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 16/277,625

(22) Filed: Feb. 15, 2019

(65) Prior Publication Data

US 2020/0265143 A1 Aug. 20, 2020

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ............. G06F 21/577; G06F 2221/033; G06F 16/2433; G06F 21/563; G06F 21/554; H04L 63/1433; H04L 63/1416
See application file for complete search history.

(56) References Cited

U.S. PATENT DOCUMENTS

| 2008/0034424 | A1* | 2/2008 | Overcash | H04L 63/1416 726/22 |
| 2010/0250143 | A1* | 9/2010 | Fraenkel | G16B 45/00 702/19 |
| 2020/0043098 | A1* | 2/2020 | Patil | G06Q 30/0201 |
| 2020/0059481 | A1* | 2/2020 | Sekar | H04L 63/1416 |
| 2020/0195686 | A1* | 6/2020 | Johns | H04L 63/1466 |

OTHER PUBLICATIONS

Cousot, Patrick et al., "Abstact Interpretation: A Unified Lattice Model for Static Analysis of Programs by Construction or Approximation of Fixpoints"; POPL '77, Proceedings of the 4th ACM SIGACT-SIGPLAN Symposium on Principles of Programming Languages; ACM, New York, NY, USA; pp. 238-252; Jan. 1977 (15 pages).

(Continued)

*Primary Examiner* — Meng Li
(74) *Attorney, Agent, or Firm* — Ferguson Braswell Fraser Kubasta PC

(57) ABSTRACT

A method may include determining that a source variable in code receives a source value from a source function specified by a target analysis, determining that a source statement in the code writes, using the source variable, the source value to a column in a table, obtaining, for a sink statement in the code, a set of influenced variables influenced by the source variable, determining that the sink statement reads the source value into a sink variable including an identifier of the column, generating a modified set of influenced variables by adding the sink variable to the set of influenced variables, and reporting a defect at the sink statement.

17 Claims, 11 Drawing Sheets

(56) References Cited

OTHER PUBLICATIONS

Cortesi, Agostino et al., "Combining Symbolic and Numerical Domains for Information Leakage Analysis" Transactions on Computational Science XXXI: Special Issue on Signal Processing and Security in Distributed Systems; pp. 98-135; Jan. 28, 2018 (38 pages).

Dahse, Johannes et al., "Static Detection of Second-Order Vulnerabilities in Web Applications"; SEC'14, Proceedings of the 23rd USENIX Conference on Security Symposium; USENIX Association, Berkeley, CA, USA; pp. 989-1003; Aug. 2014 (15 pages).

Kieyzun, Adam et al., "Automatic Creation of SQL Injection and Cross-Site Scripting Attacks"; ICSE '09, Proceedings of the 31st International Conference on Software Engineering; IEEE Computer Society, Washington, DC, USA; pp. 199-209; May 2009 (11 pages).

Yan, Lu et al., "Detection Method of the Second-Order SQL Injection in Web Applications"; Prooceedings of the Third International Workshop on Structured Object-Oriented Formal Language and Method; Springer-Verlag New York, Inc., New York, NY, USA; pp. 154-165; Feb. 21, 2014 (12 pages).

* cited by examiner

Credentials Table After Insertions
(Rows-Preserving)
400

| Username 402 | Password 404 | Role 406 | Default Applications 408 |
|---|---|---|---|
| Bob (tainted) | Pass1 (tainted) | DB | hr-application |
| SuperUser | Pass2 (tainted) | Admin | any (tainted) |
| Mary (tainted) | default | User | none |

Credentials Table After Deletion
(Rows-Preserving)
410

| Bob (tainted) | Pass1 (tainted) | DB | hr-application |
|---|---|---|---|
| Mary (tainted) | default | User | none |

FIG. 4A

Credentials Table With Sanitization
(Rows-Preserving)
420

Credentials Table
(Rows-Collapsing)
430

DETECTING SECOND-ORDER SECURITY VULNERABILITIES VIA MODELLING INFORMATION FLOW THROUGH PERSISTENT STORAGE

BACKGROUND

Applications that use database query language (e.g., Structured Query Language, or SQL) statements may become vulnerable when un-sanitized user inputs flow to the query language statements. First-order query language injections may occur when a malicious user injects a query language statement to extract sensitive data, to tamper with existing data, or cause denial of service. Second-order query language injections may occur when a malicious user deposits a payload into a database and maneuvers the application to read the payload from the database via a query language statement. Because data from the database is usually considered safe, these second-order vulnerabilities may be undetected using first-order query language injection detection mechanisms.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including determining that a source variable in code receives a source value from a source function specified by a target analysis, determining that a source statement in the code writes, using the source variable, the source value to a column in a table, obtaining, for a sink statement in the code, a set of influenced variables influenced by the source variable, determining that the sink statement reads the source value into a sink variable including an identifier of the column, generating a modified set of influenced variables by adding the sink variable to the set of influenced variables, and reporting a defect at the sink statement.

In general, in one aspect, one or more embodiments relate to a system including a memory coupled to a computer processor, a repository configured to store a table and code including a source statement and a sink statement, and a code analyzer, executing on the computer processor and using the memory, configured to determine that a source variable in the code receives a source value from a source function specified by a target analysis, determine that the source statement writes, using the source variable, the source value to a column in a table, obtain, for the sink statement, a set of influenced variables influenced by the source variable, determine that the sink statement reads the source value into a sink variable including an identifier of the column, generate a modified set of influenced variables by adding the sink variable to the set of influenced variables, and report a defect at the sink statement.

In general, in one aspect, one or more embodiments relate to a non-transitory computer readable medium including instructions that, when executed by a computer processor, perform: determining that a source variable in code receives a source value from a source function specified by a target analysis, determining that a source statement in the code writes, using the source variable, the source value to a column in a table, obtaining, for a sink statement in the code, a set of influenced variables influenced by the source variable, determining that the sink statement reads the source value into a sink variable including an identifier of the column, generating a modified set of influenced variables by adding the sink variable to the set of influenced variables, and reporting a defect at the sink statement.

Other aspects of the invention will be apparent from the following description and the appended claims.

BRIEF DESCRIPTION OF DRAWINGS

FIG. 4A, FIG. 4B, and FIG. 4C show an example in accordance with one or more embodiments of the invention.

DETAILED DESCRIPTION

Figure 1A:
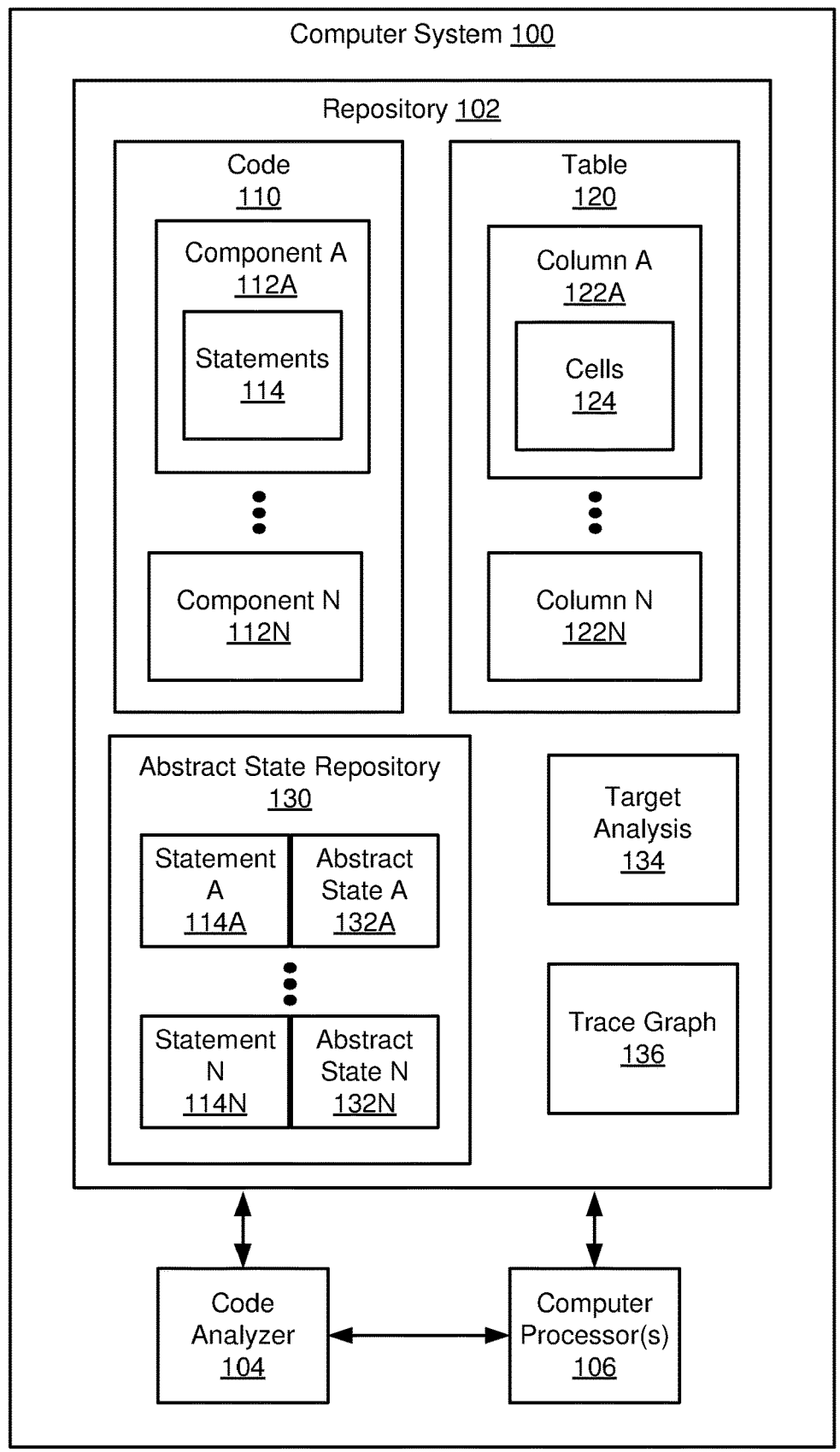
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to detecting second-order security vulnerabilities in code. In one or more embodiments, data flows from source variables to sink variables are tracked, where the flows include writes to, and reads from, persistent storage, for example, tables in a database. For example, the code may embed SQL statements. The flows of interest may be determined relative to a target analysis (e.g., a taint or escape analysis). The efficiency and precision of the analysis may be adjusted based on two factors: 1) flow granularity: whether each flow represents the dependence between two variables, or between two sets of variables, and 2) whether the values of each cell are represented, or cell values are abstracted into a value for the column.

FIG. 1A shows a computer system (100) in accordance with one or more embodiments of the invention. As shown in FIG. 1A, the computer system (100) includes a repository (102), a code analyzer (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110), one or more tables (120), an abstract state repository (130), a target analysis (134), and a trace graph (136). In one or more embodiments, the code (110) includes components (112A, 112N). A component (112A) may be a unit of source code. Programming entities defined within a component (112A) may be imported by other components. For example, the programming entities may be files, packages, classes, functions, etc. A component (112A) may include statements (114) written in a programming language, or intermediate representation (e.g., byte code). For example, the statements (114) may be written in a programming language that embeds query language (e.g., Structured Query Language, or SQL) statements. Each of the statements (114) may correspond to a location (e.g., a program point) in the code (110). For example, the location may specify a line number in a component (112A).

In one or more embodiments, a table (120) includes columns (122A, 122N). The table (120) may be stored in a database. Each column (122A) may include one or more cells (124) each including a value. Each column (122A) may have a name, type, permissions, and/or various other attributes. For example, a personnel table may include a username column, where each cell in the username column is assigned a specific value (e.g., "Bob"). Each of the cells (124) may correspond to a row of the table (120). For example, the cell in the user name column that is assigned the value "Bob" may correspond to a row that assigns values (e.g., Bob's password, Bob's permissions, etc.) to the columns (122A, 122N) of the table (120).

Figure 1B:
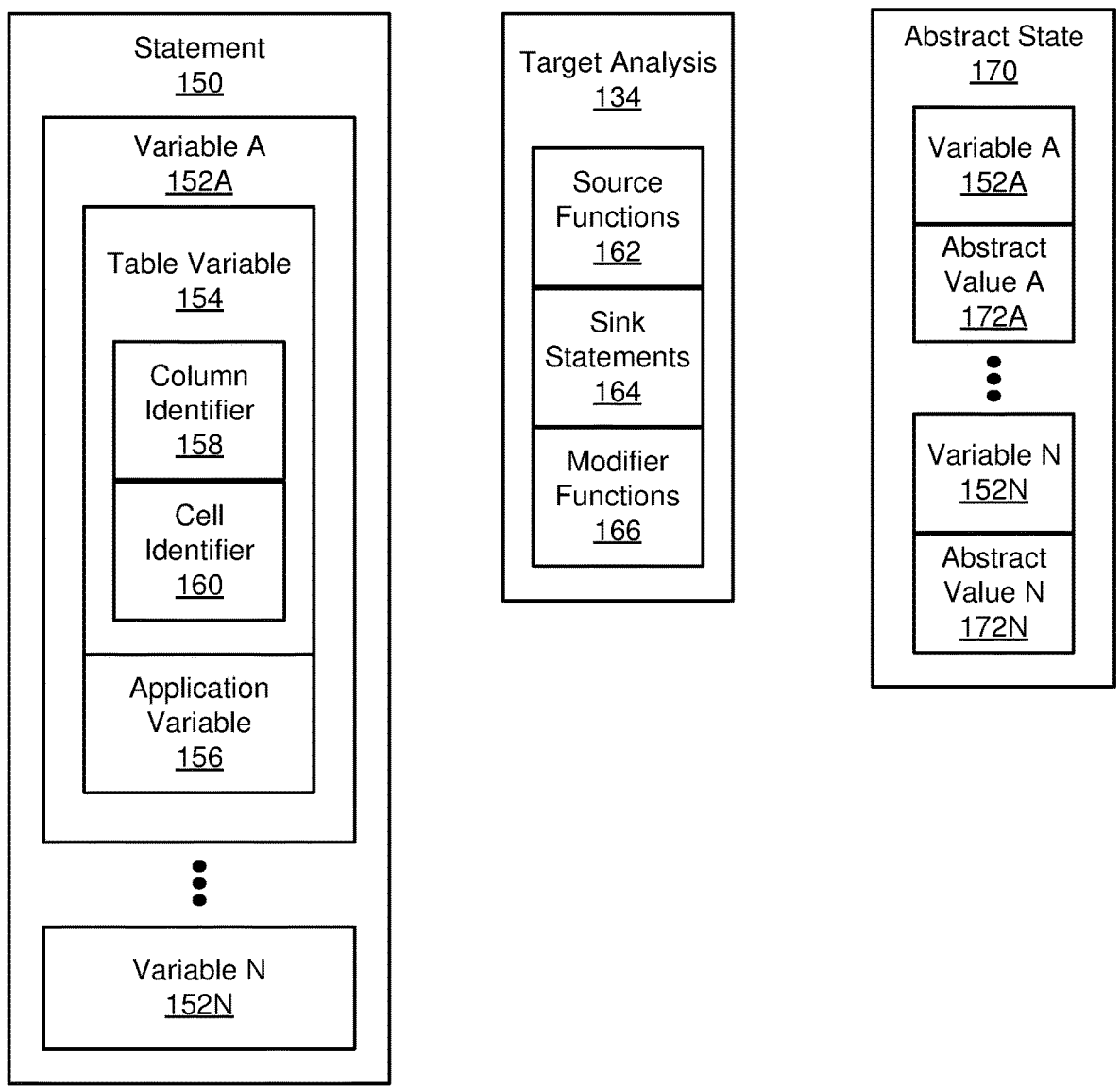

Turning to FIG. 1B, in one or more embodiments, a statement (150) includes variables (152A, 152N). Each variable (152A) may be a table variable (154) or an application variable (156). In one or more embodiments, a table variable (154) accesses the contents of one or more tables. The table variable (154) may include a column identifier (158) of a column (122A) in a table (120). The column identifier (158) may be thought of as a variable in the sense that the column identifier (158) may be used as a placeholder for the values of the cells of the column (122A), analogous to a variable that functions as a placeholder for the possible values of the variable.

Alternatively, the table variable (154) may be a cell identifier (160) corresponding to one of the cells (124) in a table (120). In one or more embodiments, the cell identifier (160) includes a column identifier (158) and a row identifier. The row identifier may correspond to a row in the table (120).

In one or more embodiments, an application variable (156) may reference a location in the code (110) where a value is stored, such as an allocation site. An allocation site may be a statement in the code (110) that declares, instantiates, and/or initializes an object. An application variable (156) may refer to a simple allocation site (e.g., a numerical or string value), may refer to a complex allocation site (e.g., a base object or structure containing one or more fields), or may refer to a field in a complex allocation site. The allocation site may contain different values at different points in time. In one or more embodiments, the allocation site may refer to a location in a memory (e.g., a heap memory) of the computer system (100) that is allocated when a function in the code (110) is executed.

Returning to FIG. 1A, in one or more embodiments, the abstract state repository (130) assigns abstract states (132A, 132N) to statements (114A, 114N). Returning to FIG. 1B, in one or more embodiments, an abstract state (170) assigns abstract values (172A, 172N) to variables (152A, 152N). In one or more embodiments, each abstract value (172A, 172N) corresponds to a set of concrete values. An abstract value (172A) may correspond to a set of concrete values that may be assigned to a variable (152A) during the execution of the code (110). Thus, an abstract value (172A) may define a constraint on the possible concrete values that may be assigned to a variable (152A) during the execution of the code (110). In one or more embodiments, an abstract value (172A) may be represented by a regular expression. For example, the regular expression may represent the possible string values of a variable (152A) as determined by a string-constraint solver. Examples of abstract values (172A, 172N) for integers include: any integer, any positive integer, any even integer, any odd integer, any nonzero integer, a set of specific integers, etc. Examples of abstract values (172A, 172N) for strings include: any string, any non-empty string, a specific string, a set of specific strings, numerical strings, non-numerical strings, etc.

Returning to FIG. 1A, in one or more embodiments, the target analysis (134) is a type of analysis to be performed on the code (110). In one or more embodiments, the target analysis (134) is performed using abstract interpretation. Abstract interpretation is a static analysis technique that over-approximates the behavior of the code (110), enabling the code analyzer (104) to check whether the code (110) can exhibit defective (e.g., malicious) behavior under any possible execution, without directly executing the code (110). In one or more embodiments, the static analysis analyzes abstract states (132A, 132N) associated with statements (114A, 114N).

Returning to FIG. 1B, in one or more embodiments, the target analysis (134) includes source functions (162), sink statements (164), and modifier functions (166). In one or more embodiments, a source function (162) may receive a value of interest, relative to a type of analysis to be performed on the code (110). For example, when the target analysis (134) is a taint analysis, the source function (162) may receive a tainted value from an external source. Continuing this example, the tainted value may correspond to a user-supplied or externally generated value (e.g., an unknown value that is potentially controlled by an attacker). The source function (162) may receive the tainted value directly from an external source (e.g., via an application program interface (API)). Alternatively, the source function (162) may receive the tainted value via a taint flow (e.g., via a series of function calls that transmit the tainted value from the external source). As another example, when the target analysis (134) is an escape analysis, the source function (162) may receive sensitive data (e.g., where the source function (162) may have confidential access privileges).

In one or more embodiments, a sink statement (164) may utilize the source value (e.g., in a manner that represents a security flaw), relative to the target analysis (134). For example, when the analysis of the code (110) is a taint analysis, the sink statement (164) may access a security-sensitive resource of the computer system (100). Alternatively, the sink statement may provide a tainted value to another sink statement that accesses a security-sensitive resource. As another example, when the analysis of the code (110) is an escape analysis, the sink statement (164) may permit unprivileged (e.g., public) access to the sensitive data, and thus may represent a confidential information leakage point.

In one or more embodiments, a modifier function (166) may modify the source value to prevent a potential security flaw. For example, in a taint analysis, a modifier function (166) may sanitize tainted data to render the tainted data harmless. Similarly, in an escape analysis, a modifier function (166) may declassify (e.g., redact) sensitive data.

Returning to FIG. 1A, in one or more embodiments, the trace graph (136) represents potential flows of values (e.g., source values provided by source functions (162) of FIG. 1B) through a succession of variables (152A, 152N) used in a succession of statements (114). For example, a path in the trace graph (136) may correspond to a defect (e.g., a taint flow or an escape flow) in the code (110). Continuing this example, in the context of a security analysis, a path in the trace graph (136) may indicate how variables (152A, 152N) becomes tainted, or release sensitive data.

In one or more embodiments, the code analyzer (104) is implemented in hardware (e.g., circuitry), software, firmware, and/or any combination thereof. In one or more embodiments, the code analyzer (104) includes functionality to perform a static analysis of the code (110) (e.g., using the target analysis (134)). The code analyzer (104) may include functionality to report a defect in the code (110) using the static analysis. The code analyzer (104) may include functionality to perform different types of static analyses on different components (112A, 112N) of the code (110).

In one or more embodiments, the computer processor (106) includes functionality to execute the code (110). In one or more embodiments, the computer processor (106) includes functionality to execute the code analyzer (104).

While FIG. 1A shows a configuration of components, other configurations may be used without departing from the scope of the invention. For example, various components may be combined to create a single component. As another example, the functionality performed by a single component may be performed by two or more components.

Figure 2:
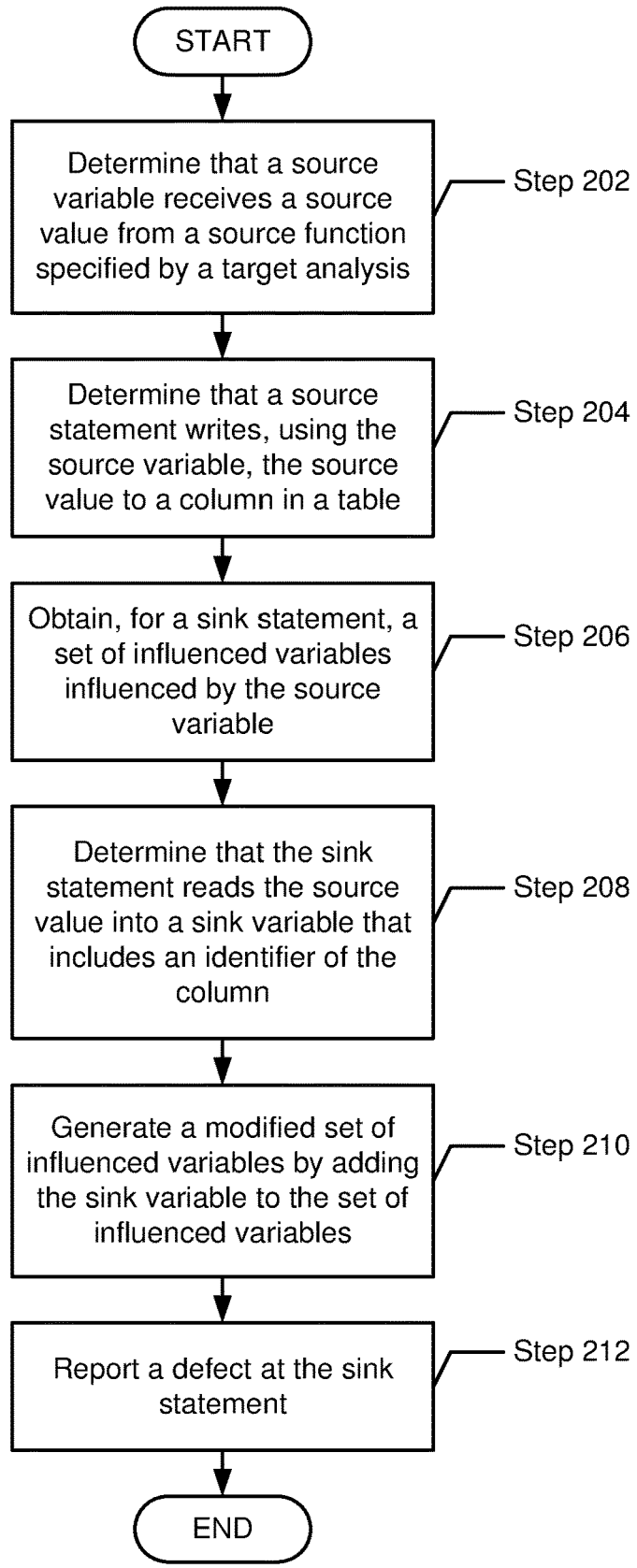
FIG. 2, FIG. 3A, FIG. 3B, FIG. 3C, and FIG. 3D show flowcharts in accordance with one or more embodiments of the invention.

FIG. 2 shows a flowchart in accordance with one or more embodiments of the invention. The flowchart depicts a process for row-collapsing information flow analysis. One or more of the steps in FIG. 2 may be performed by the components (e.g., the code analyzer (104) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a determination is made that a source variable receives a source value from a source function specified by a target analysis. For example, the source variable may receive a tainted value when the target analysis is a taint analysis. Alternatively, the source variable may receive a confidential value when the target analysis is an escape analysis. In one or more embodiments, the source value is the result of an expression that includes one or more source variables. The expression may be a conditional expression used to select rows from a table.

In Step 204, a determination is made that a source statement in code writes, using the source variable, the source value to a column in a table. For example, the source statement may be an SQL insert or update statement. The source value may be written to a cell of the column, where the cell corresponds to a row in the table.

In Step 206, a set of one or more influenced variables influenced by the source variable is obtained for a sink statement in the code. In one or more embodiments, the sink statement is a sink statement specified by the target analysis. For example, when the target analysis is a taint analysis, the sink statement may access a security-sensitive resource of the computer system. Alternatively, when the target analysis is an escape analysis, the sink statement may permit unprivileged access to confidential data. In one or more embodiments, the target analysis specifies that the sink statements are data manipulation statements that modify data in (e.g., insert, update, or delete) a column in a table.

In one or more embodiments, the code analyzer tracks the aggregate (e.g., over-approximated) dependence of the set of influenced variables on a set of source variables (e.g., instead of precisely tracking the specific source variable that influences a specific sink variable), which sacrifices some precision in exchange for greater computational efficiency.

In one or more embodiments, the code analyzer obtains the set of influenced variables by performing a static analysis (e.g., the target analysis) on the code. In one or more embodiments, the static analysis uses abstract interpretation techniques to assign abstract values to the variables used in the sink statement. For example, the code analyzer may compute, using constraint propagation and/or constraint satisfaction algorithms, the abstract values assigned to different variables, where each abstract value constrains the possible concrete values that may be assigned to the corresponding variable.

In Step 208, a determination is made that the sink statement reads the source value into a sink variable that includes an identifier of the column. For example, the sink variable may be a column identifier whose corresponding column has been influenced (e.g., tainted) by the source value written to the column. The source value may be written to a cell of the column identified by the column identifier, where the cell corresponds to a row in the table.

In Step 210, a modified set of influenced variables influenced by the source variable is generated by adding the sink variable to the set of influenced variables. Continuing the above example, after processing the following sink statement, the code analyzer may add the column identifier "credentials.username" to the set of influenced variables, if variable v is already in the set of influenced variables: INSERT INTO credentials(username) VALUES (v). Continuing this example, if variable v is tainted, then the column identifier "credentials.username" is also tainted.

In one or more embodiments, the code analyzer may modify the set of influenced variables influenced by the source variable by removing the sink variable from the set of influenced variables. Continuing the above example, a delete statement may remove the source value from the column, and thus may eliminate the influence of the column on the set of influenced variables.

In Step 212, a defect is reported at the sink statement. In one or more embodiments, the defect at the sink statement is due to the influence of the source variable on the sink variable. For example, the sink variable may provide, to a security-sensitive function, a tainted value received from the source variable. Alternatively, the sink variable may provide, to a function that permits unprivileged access, a confidential value from the source variable.

The code analyzer may report the defect based on the influence of the source variable on the sink variable, regardless of the specific value of the source variable. For example, if a source variable writes a tainted value to any cell in the column, then the entire column may be considered tainted.

In one or more embodiments, a defect is prevented when the source value received from the source variable is modified prior to receipt by the sink variable. In one or more embodiments, the code analyzer reports that a defect has been prevented due to the effect of a modifier. For example, when the target analysis is a taint analysis, the source value may be modified by a sanitizer prior to receipt by the sink variable. Alternatively, when the target analysis is an escape analysis, the source value may be modified by a declassifier prior to receipt by the sink variable.

The row-collapsing information flow analysis described in FIG. 2 is efficient, and thus scalable to large codebases, for the following reasons: 1) the analysis focuses on specific information flows based on source variables that receive source values from source functions specified by a target analysis; and 2) the analysis overapproximates the influence of the source variables on sets of influenced variables (e.g., instead of precisely identifying each specific variable directly influenced by the source variable), which sacrifices some precision in exchange for greater computational efficiency. In contrast, the dependency analysis described in FIG. 3C below tracks precise dependency information between variables, thus achieving greater precision, at the cost of greater computational overhead and a reduction in scalability.

Figure 3A:
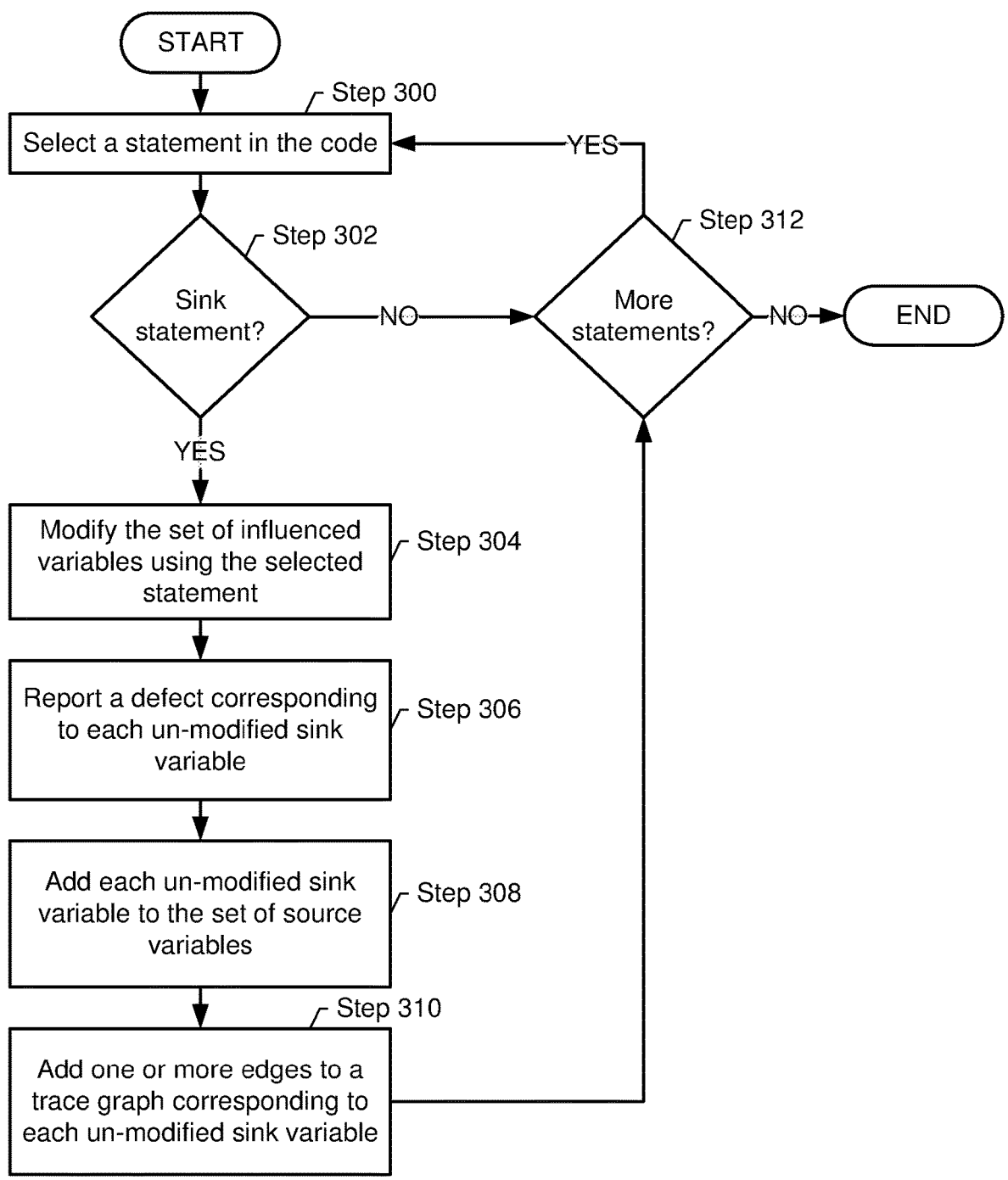

FIG. 3A shows a flowchart in accordance with one or more embodiments of the invention. The flowchart depicts a process for row-collapsing information flow analysis. One or more of the steps in FIG. 3A may be performed by the components (e.g., the code analyzer (104) of the computer system (100)), discussed above in reference to FIG. 1A. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, a statement in the code is selected. In the first iteration of Step 300, the code analyzer may select the first statement in the code to be executed when the code is invoked. In one or more embodiments, in the first iteration of Step 300, a set of one or more influenced variables influenced by a set of one or more source variables is obtained for the first statement (see description of Step 206 above). In subsequent iterations of Step 300 code analyzer may select statements according to the order in which the statements appear in the code (e.g., based on the memory locations corresponding to the statements).

If, in Step 302, a determination is made that the statement is a sink statement (e.g., as specified in the target analysis), then Step 304 below is executed. Otherwise, if in Step 302 a determination is made that the statement is not a sink statement, then Step 312 below is executed.

In Step 304, the set of influenced variables is modified, using the statement (see description of Step 210 above). In one or more embodiments, the code analyzer adds each un-modified sink variable of the statement that is not already in the set of influenced variables, to the set of influenced variables. The sink variable may be a variable of the statement that receives a source value. In one or more embodiments, the sink variable is not added to the set of influenced variables when the source value is modified (e.g., sanitized or declassified) before the sink variable reads the source value. For example, a tainted source value may be sanitized when the target analysis is a taint analysis. Alternatively, a confidential source value may be declassified when the target analysis is an escape analysis.

In Step 306, a defect is reported corresponding to each un-modified sink variable (see description of Step 212 above).

In Step 308, each un-modified sink variable is added to the set of source variables. That is, each un-modified sink variable may in turn function as a source variable that may influence (e.g., transmit a source value to) variables in statements selected in subsequent iterations of Step 300 above. In one or more embodiments, the code analyzer reconfigures the target analysis to specify that the sink statements may include query language data extraction statements (e.g., the SQL select statement), in addition to query language data manipulation statements (e.g., insert or update statements). For example, a sink variable in a query language data extraction statement may read the source value (e.g., from a column) using one of the variables in the set of source variables.

In Step 310, one or more edges are added to a trace graph corresponding to each un-modified sink variable. In one or more embodiments, each edge connects one of the variables in the set of source variables and the un-modified sink variable. In one or more embodiments, since the code analyzer tracks the aggregate dependence of the set of influenced variables on the set of source variables, the code analyzer adds an edge between each variable in the set of source variables and each un-modified sink variable. In one or more embodiments, a defect reported in Step 306 above corresponds to a path through the trace graph. For example, the path may include a series of edges connecting a series of nodes representing a series of influenced variables influenced (e.g., tainted) by a source value. The report may include a path corresponding to the defect (e.g., to enable a developer to understand the flow of the source value through variables and statements of the code).

If in Step 312 a determination is made that there are additional statements in the code, then Step 300 above is again executed to select another (e.g., the next) statement in the code.

Figure 3B:
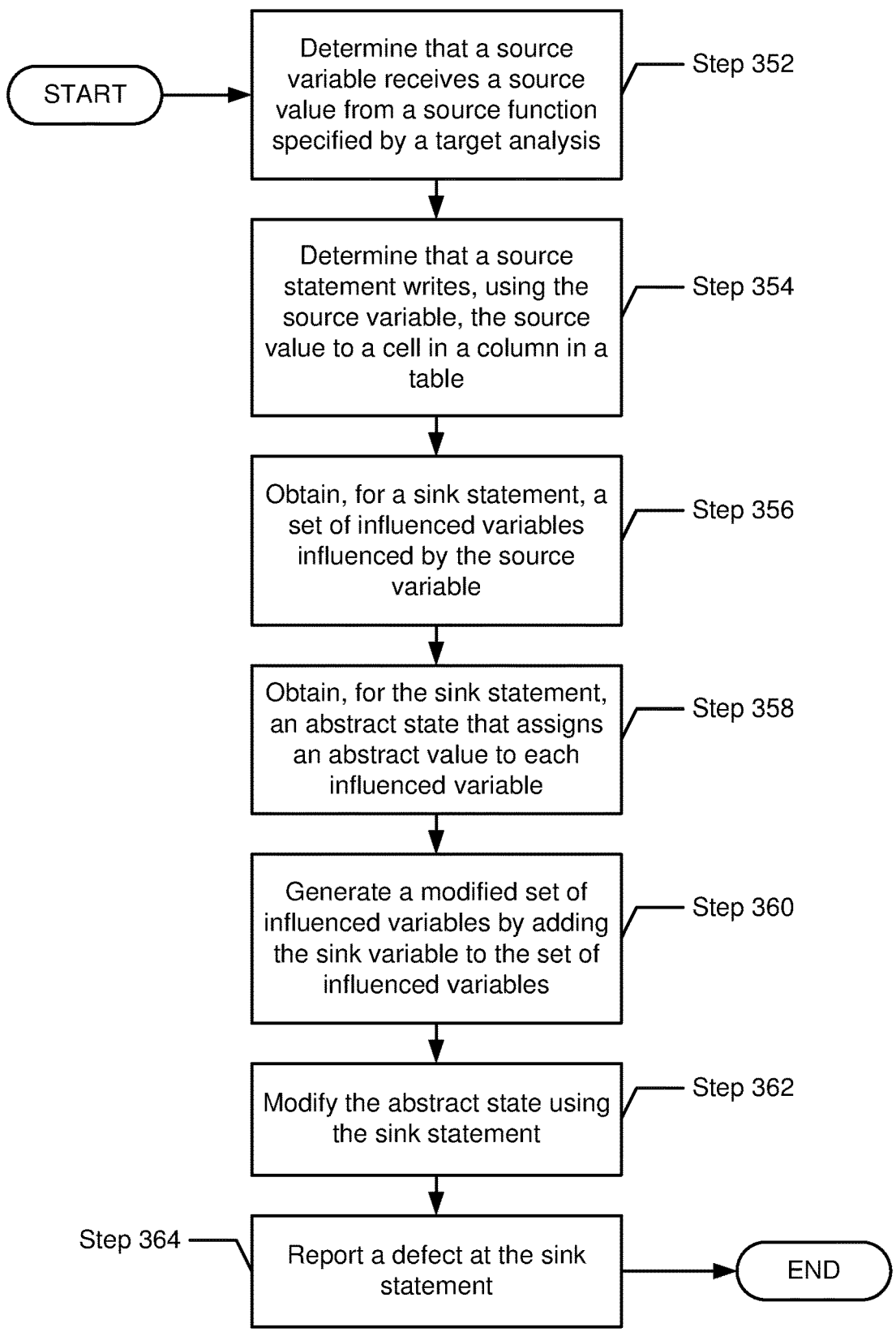

FIG. 3B shows a flowchart in accordance with one or more embodiments of the invention. The flowchart depicts a process for row-preserving information flow analysis. One or more of the steps in FIG. 3B may be performed by the components (e.g., the code analyzer (104) of the computer system (100)), discussed above in reference to FIG. 1A. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 352, a determination is made that a source variable receives a source value from a source function specified by a target analysis (see description of Step 202 above).

In Step 354, a determination is made that a source statement writes, using the source variable, the source value to a cell in a column in a table (see description of Step 204 above).

In Step 356, a set of influenced variables influenced by the source variable is obtained for a sink statement (see description of Step 206 and Step 208 above). The sink statement may read the source value into a sink variable that includes an identifier of the cell. For example, the identifier of the cell may include a column identifier and a row identifier.

In Step 358, an abstract state that assigns an abstract value to each of the influenced variables is obtained for the sink statement (see description of Step 206 above).

In Step 360, a modified set of influenced variables influenced by the source variable is generated by adding the sink variable to the set of influenced variables (see descriptions of Step 210 and Step 304 above). In one or more embodiments, the cell identifier represents a sink variable that has been influenced by the source value.

In Step 362, the abstract state is modified using the sink statement. In one or more embodiments, the abstract values assigned to the influenced variables are based on the abstract values assigned to a set of source variables. The set of source variables may include the source variable of Step 352 above. For example, the code analyzer may use the aggregate constraints represented by the abstract values assigned to the set of source variables to generate (e.g., using a constraint solver) the abstract values for each of the influenced variables.

In Step 364, a defect is reported at the sink statement (see description of Step 212 above).

The row-preserving information flow analysis described in FIG. 3B is efficient for the following reason. Although the source variables and influenced variables correspond to cells of a table, the cells may be abstract cells that are assigned abstract values, thus limiting the number of cells, and the overall size of the table. For example, there may be one abstract cell corresponding to each variable of each statement. The abstract values assigned to the cells are precise, relative to the precision of the constraint solving and abstract interpretation algorithms used by the code analyzer.

Figure 3C:
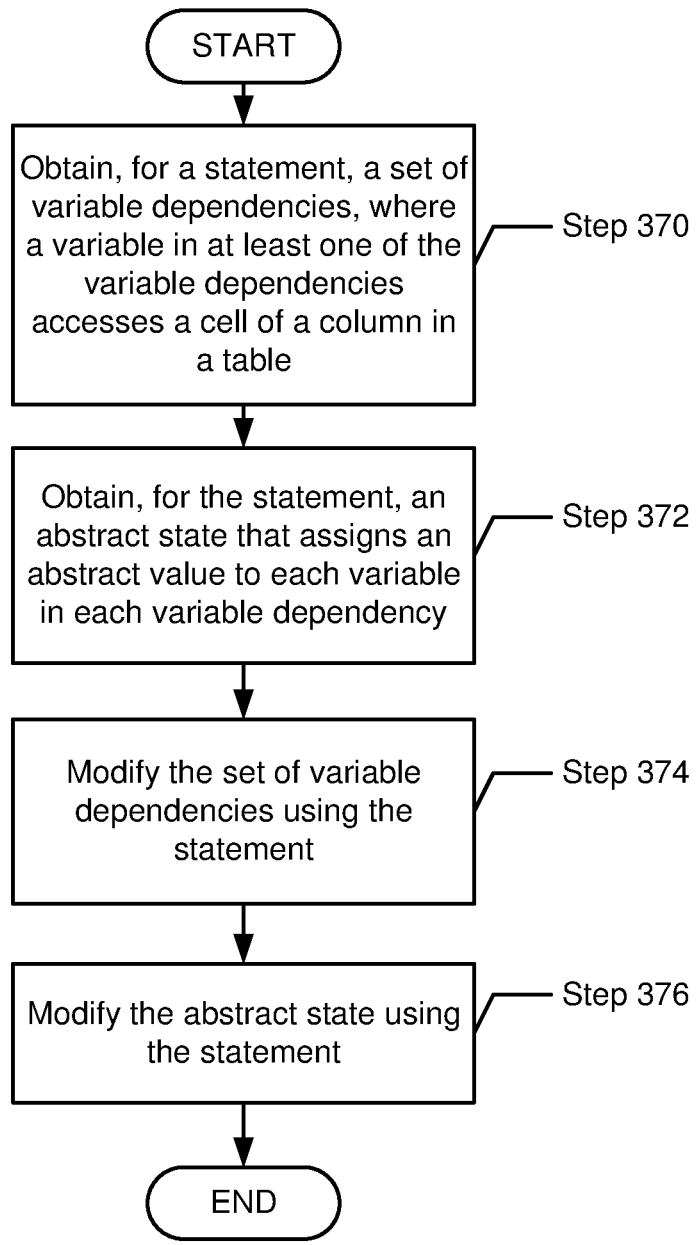

FIG. 3C shows a flowchart in accordance with one or more embodiments of the invention. The flowchart depicts a process for row-preserving dependency analysis. One or more of the steps in FIG. 3C may be performed by the components (e.g., the code analyzer (104) of the computer system (100)), discussed above in reference to FIG. 1A. In one or more embodiments of the invention, one or more of the steps shown in FIG. 3C may be omitted, repeated, and/or performed in parallel, or in a different order than the order shown in FIG. 3C. Accordingly, the scope of the invention should not be considered limited to the specific arrangement of steps shown in FIG. 3C.

Initially, in Step 370, a set of variable dependencies each including a pair of variables is obtained for a statement in code. Each variable dependency may include an independent variable and a dependent variable. In one or more embodiments, the code analyzer tracks, for each variable dependency, the precise, individual dependence of the dependent variable on the corresponding independent variable. In contrast, the information flow analyses described in FIG. 2, FIG. 3A, and FIG. 3B track the aggregate dependence of the set of influenced variables on a set of source variable. In one or more embodiments, one of the variables in the variable dependency corresponds to a cell in a column of a table. For example, the statement may write the value of the variable to the cell (e.g., when the statement is a data manipulation statement, that inserts, updates, or deletes data in the cell). Alternatively, the statement may read the value of the cell into the variable (e.g., when the statement is a data extraction statement, that selects data from the cell).

In Step 372, an abstract state that assigns an abstract value to each variable in each of the variable dependencies is obtained for the statement (see description of Step 206 above).

In Step 374, the set of variable dependencies is modified, using the statement (see descriptions of Step 210 and Step 304 above). In one or more embodiments, a new variable dependency is added to the set of variable dependencies. For example, the dependent variable of the variable dependency may be a cell identifier of a cell whose value is written using the value of the independent variable of the variable dependency. Alternatively, a variable dependency may be removed from the set of variable dependencies (e.g., when a value is deleted from a cell or the cell itself is deleted).

In Step 376, the abstract state is modified using the statement. In one or more embodiments, the code analyzer assigns an abstract value to the dependent variable in each variable dependency based on the abstract value assigned to the independent variable in the variable dependency. For example, the abstract value assigned to the independent variable may be used as a constraint on the abstract value assigned to the dependent variable.

Figure 3D:
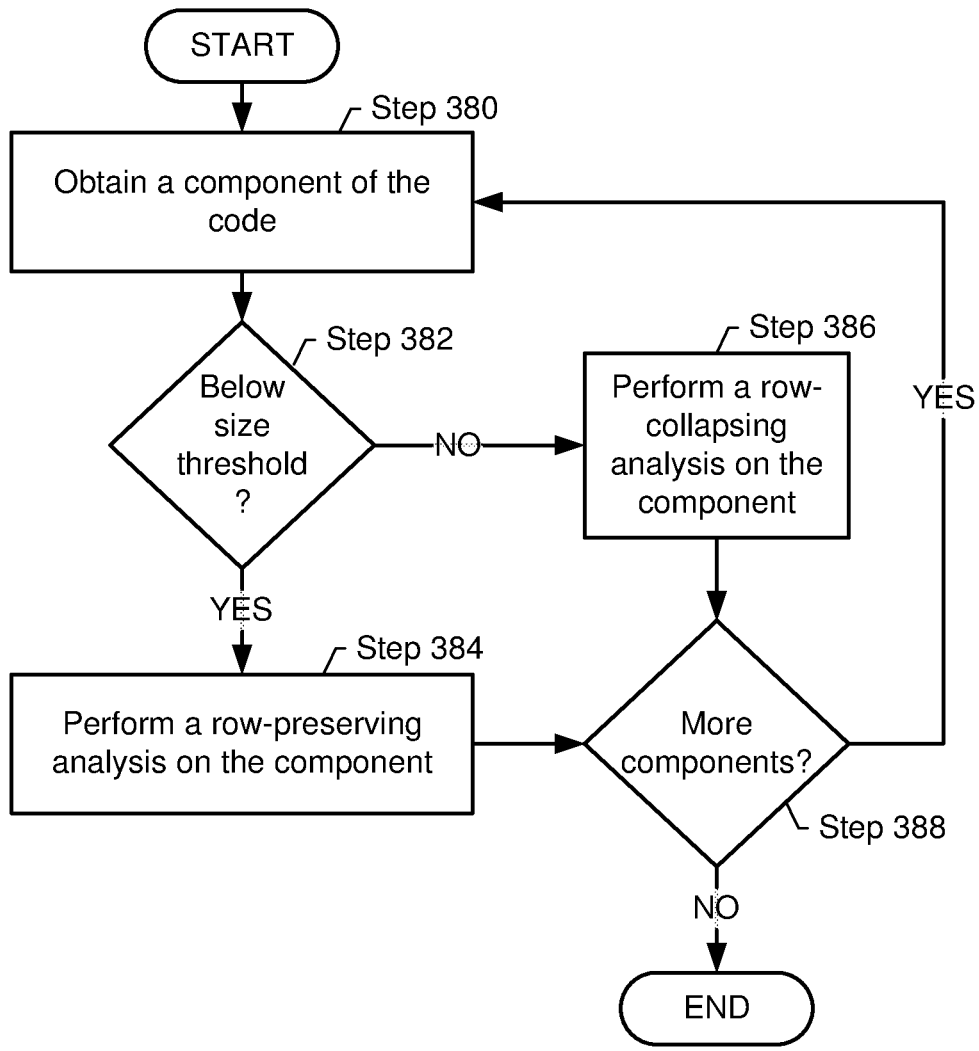

FIG. 3D shows a flowchart in accordance with one or more embodiments of the invention. The flowchart depicts a process for detecting security vulnerabilities through persistent storage. One or more of the steps in FIG. 3D may be performed by the components (e.g., the code analyzer (104) of the computer system (100)), discussed above in reference to FIG. 1A. In one or more embodiments of the invention, one or more of the steps shown in FIG. 3D may be omitted, repeated, and/or performed in parallel, or in a different order than the order shown in FIG. 3D. Accordingly, the scope of the invention should not be considered limited to the specific arrangement of steps shown in FIG. 3D.

Initially, in Step 380, a component of the code is obtained. For example, the component may be a method, class, or file of the code.

If, in Step 382, a determination is made that the size of the component is below a predetermined threshold, then Step 384 below is executed. Otherwise, if in Step 382 a determination is made that the size of the component is not below the predetermined threshold, then Step 386 below is executed.

In Step 384, a row-preserving analysis is performed on the component. For example, the row-preserving analysis may be the row-preserving information flow analysis described in FIG. 3B above. Alternatively, the row-preserving analysis may be the row-preserving dependency analysis described in FIG. 3C above.

In one or more embodiments, the code analyzer aborts the row-preserving analysis of the component if, during the execution of the row-preserving analysis, a predetermined amount of time has elapsed. For example, the code analyzer may switch to a row-collapsing analysis on the component after aborting the row-preserving analysis.

In Step 386, a row-collapsing analysis is performed on the component. For example, the row-collapsing analysis may be the row-collapsing information flow analysis described in FIG. 2 above.

If in Step 388 a determination is made that there are additional components in the code, then Step 380 above is again executed to obtain another component in the code.

Figure 4B:
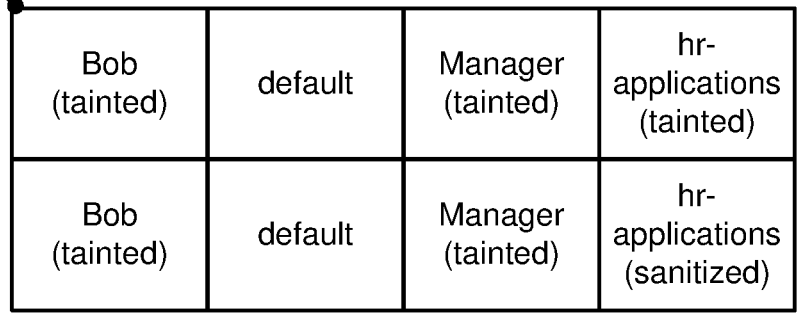
Figure 4B:
Figure 4C:
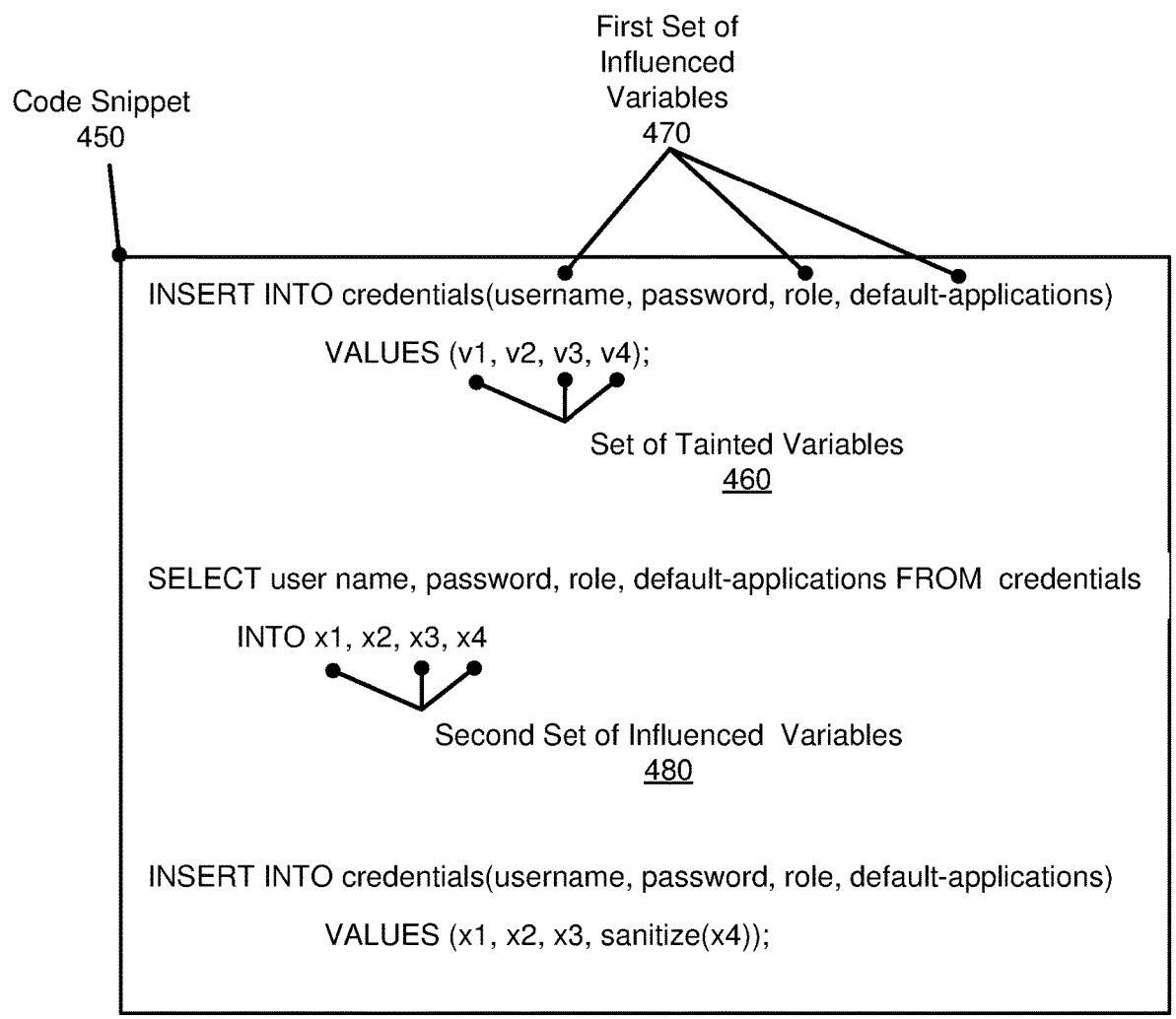

The following example is for explanatory purposes only and not intended to limit the scope of the invention. FIG. 4A, FIG. 4B, and FIG. 4C show implementation examples in accordance with one or more embodiments of the invention. FIG. 4A contrasts rows-collapsing and rows-preserving views of a credentials table. The rows-preserving views of the credentials table after insertions (400) ((120) in FIG. 1A) shows that some values in the username (402), password (404), and default applications (408) columns ((122A, 122N) in FIG. 1A) are tainted, while none of the values in the role (406) column are tainted. If the code analyzer ((104) in FIG. 1A) abstracts the credentials table to a single row during a rows-collapsing analysis, the result is (tainted, tainted, untainted, tainted), since each column except the role (406) column contains at least one tainted value. That is, a rows-collapsing analysis takes an abstracted view of the column, such that when any cell in a column contains a tainted value, the entire column is considered to be tainted.

The rows-preserving views of the credentials table after deletion (410) shows the result of deleting the second row in the credentials table. The second row had contained the only tainted value of the default applications (408) column. However, deleting the second row does not change the rows-collapsing view of the credentials table, since the rows-collapsing analysis does not track specific cell values. Alternatively, if the code analyzer had first applied a rows-preserving analysis, and then switched to a rows-collapsing analysis, the result would be (tainted, tainted, untainted, untainted), because the second row with the tainted default applications (408) value was deleted before the rows-collapsing analysis was applied. Thus, FIG. 4A illustrates how a rows-preserving analysis may yield more precise results than a rows-collapsing analysis. Furthermore, switching from a rows-preserving analysis to a rows-collapsing analysis may yield more precise results than if a pure rows-collapsing analysis was used.

FIG. 4B and FIG. 4C illustrate the processing of statements during rows-preserving and rows-collapsing information flow analyses. Turning to FIG. 4B, the rows-preserving view of the credentials table with sanitization (420) illustrates both tainted and sanitized values. The first row of the rows-preserving view of the credentials table with sanitization (420) is inserted as a result of the first INSERT statement in the code snippet (450) ((110) in FIG. 1A) of FIG. 4C. The first INSERT statement inserts the values of variables v1, v2, v3, and v4, which are assigned values Bob, default, Manager, and hr-applications, respectively. The variables v1, v3, and v4 are included in the set of tainted (e.g., source) variables (460) ((152A, 152N) in FIG. 1B).

When processing the first INSERT statement, the code analyzer determines that the first set of influenced variables (470) are influenced by the set of tainted variables (460). That is, the code analyzer tracks the dependence of a set of influenced variables on a set of tainted variables. In contrast, when the analysis is a dependency analysis, the code analyzer tracks the dependence of specific dependent variables (e.g., the column identifier "credentials.username") on independent variables (e.g., the variable v1). In this example, a taint analysis ((134) in FIG. 1A and FIG. 1B) specifies the relevant taint functions and sink (e.g., security-sensitive) statements. The sink statements include all SQL data manipulation statements and data extraction statements.

In a rows-collapsing analysis, the first set of sink variables (470) resulting from processing the first INSERT statement includes the column identifiers "credentials.username", "credentials.role", and "credentials.default-applications". In contrast, in a rows-preserving analysis, the first set of sink variables (470) includes cell identifiers (e.g., column identifiers plus row identifiers) corresponding to the inserted cells in the credentials table. The code analyzer modifies the set of tainted variables (460) by adding the first set of sink variables (470) to the set of tainted variables (460) in order to track second-order SQL injections due to the extraction of the tainted values from the credentials table.

In the SELECT statement of the code snippet (450), the values in the first row of the credentials table are read into variables x1, x2, x3, and x4. When processing the SELECT statement, the code analyzer determines that the second set of influenced variables (480) (i.e., the variables x1, x3, and x4 of the SELECT statement) are influenced by the values of the modified set of tainted variables. For example, the modified set of tainted variables includes the first set of sink variables (470) (e.g., the aforementioned column identifiers "credentials.username", "credentials.role", and "credentials.default-applications"), whose values are read into the second set of influenced variables (480). The code analyzer reports defects (i.e., taint flows) at the SELECT statement due to the flow from the tainted variables (460) (i.e., the variables v1, v3, and v4) of the first INSERT statement to the second set of sink variables (480). The defects are second-order defects resulting from the insertion of tainted values into the table, followed by the extraction of the tainted values from the table.

The second row of the rows-preserving view of the credentials table with sanitization (420) is inserted as a result of the second INSERT statement in the code snippet (450). The second INSERT statement sanitizes the variable x4 before performing the insert into the credentials table. Thus, the sanitization of the variable x4 is reflected in the second row. In contrast, the rows-collapsing view of the credentials table (430) lacks any information about sanitized values.

Figure 5A:
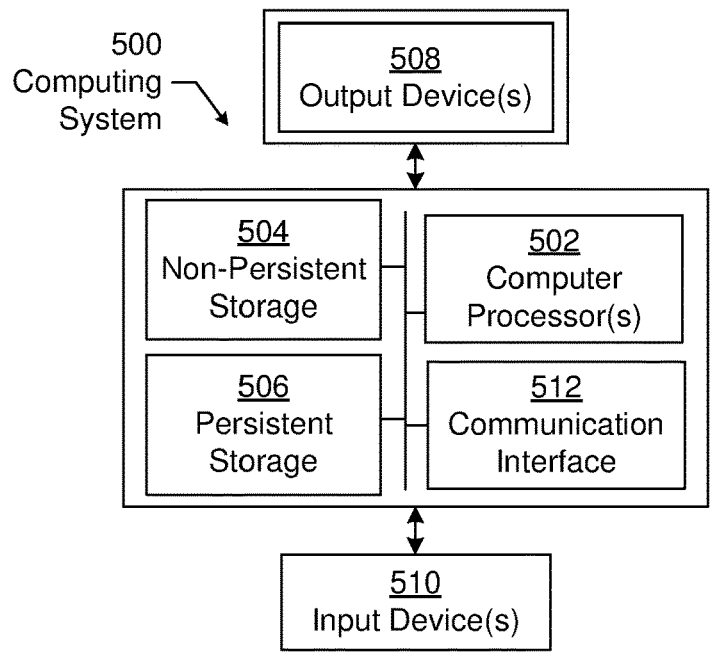
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
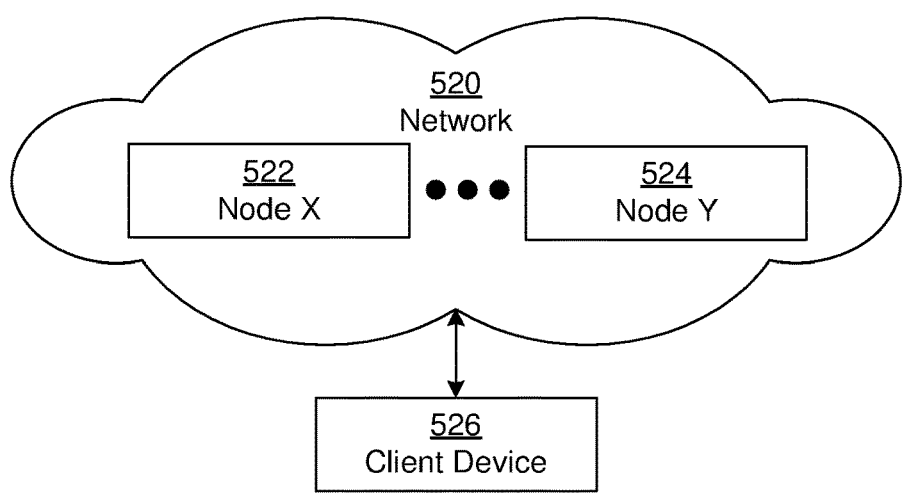

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   determining that a first source variable in code receives a first source value from a first source function specified by a target analysis;
   determining that a first source statement in the code writes, using the first source variable, the first source value to a column in a table;
   obtaining, for a first sink statement in the code, a first set of influenced variables influenced by the first source variable;
   determining that the first sink statement reads the first source value into a first sink variable comprising an identifier of the column and an identifier of a row in the table;
   generating a modified first set of influenced variables by adding the first sink variable to the first set of influenced variables;
   obtaining, for the first sink statement, a first abstract state that assigns a first abstract value to each of the first set of influenced variables;
   modifying the first abstract state using the first sink statement; and
   reporting a first defect at the first sink statement.

2. The method of claim 1, further comprising:
   obtaining, for a second sink statement in the code, a second sink variable influenced by the first sink variable, wherein the second sink variable reads the first source value;
   adding the second sink variable to the modified first set of influenced variables; and
   reporting a second defect at the second sink statement.

3. The method of claim 1, wherein the first set of influenced variables is further influenced by a set of source variables, wherein the set of source variables comprises the first source variable, the method further comprising:
   obtaining, for a second sink statement in the code, a second set of influenced variables influenced by the first set of influenced variables;
   adding, to a trace graph, a plurality of nodes comprising:
      a plurality of source nodes corresponding to the set of source variables,
      a first plurality of influenced variable nodes corresponding to the first set of influenced variables, and
      a second plurality of influenced variable nodes corresponding to the second set of influenced variables,
   wherein each of the plurality of nodes comprises a location in the code;
   adding, to the trace graph, a first plurality of edges each connecting one of the plurality of source nodes and one of the first plurality of influenced variable nodes;
   adding, to the trace graph, a second plurality of edges each connecting one of the first plurality of influenced variable nodes and one of the second plurality of influenced variable nodes; and
   reporting a defect trace comprising one of the first plurality of edges and one of the second plurality of edges.

4. The method of claim 1,
   wherein the code further comprises:
      (i) a first component comprising the first sink statement, and
      (ii) a second component comprising a second sink statement,
   wherein the second component has a size below a predetermined threshold, and
   wherein the method further comprises:
      determining that a second source variable in the code receives a second source value from a second source function specified by the target analysis;
      determining that a second source statement in the code writes, using the second source variable, the second source value to a cell in the column;
      obtaining, for the second sink statement:
         a second set of influenced variables influenced by the second source variable, and
         a second abstract state that assigns a second abstract value to each of the second set of influenced variables,
         wherein the second sink statement reads the second source value into a second sink variable comprising an identifier of the cell;
      adding the second sink variable to the second set of influenced variables;
      modifying the second abstract state using the second sink statement; and
      reporting a second defect at the second sink statement.

5. The method of claim 1, further comprising:
   obtaining, for a first statement in the code, a second abstract state and a set of variable dependencies each comprising a pair of variables, wherein at least one of the set of variable dependencies comprises a variable that corresponds to a cell in the column, and wherein the second abstract state assigns a second abstract value to each variable in each of the set of variable dependencies; and
   modifying, using the first statement, the set of variable dependencies and the second abstract state.

6. The method of claim 1, further comprising:
   obtaining, for a second sink statement in the code, a second sink variable influenced by the first sink variable, wherein the second sink variable reads the first source value;
   adding the second sink variable to the modified first set of influenced variables;
   determining that the first source value is modified by a modifier function prior to the second sink variable accessing the first source value; and
   in response to determining that the first source value is modified by the modifier function prior to the second sink variable accessing the first source value, reporting that a defect at the second sink statement was prevented.

7. A system, comprising:
a memory coupled to a computer processor;
a repository configured to store a table and code comprising a first source statement and a first sink statement; and
a code analyzer, executing on the computer processor and using the memory, configured to:
determine that a first source variable in the code receives a first source value from a first source function specified by a target analysis,
determine that the first source statement writes, using the first source variable, the first source value to a column in a table,
obtain, for the first sink statement, a first set of influenced variables influenced by the first source variable,
determine that the first sink statement reads the first source value into a first sink variable comprising an identifier of the column and an identifier of a row in the table,
generate a modified first set of influenced variables by adding the first sink variable to the first set of influenced variables,
obtain, for the first sink statement, an abstract state that assigns an abstract value to each of the first set of influenced variables,
modify the abstract state using the first sink statement, and
report a first defect at the first sink statement.

8. The system of claim 7, wherein the code analyzer is further configured to:
obtain, for a second sink statement in the code, a second sink variable influenced by the first sink variable, wherein the second sink variable reads the first source value;
add the second sink variable to the modified first set of influenced variables; and
report a second defect at the second sink statement.

9. The system of claim 7, wherein the first set of influenced variables is further influenced by a set of source variables, wherein the set of source variables comprises the first source variable, and wherein the code analyzer is further configured to:
obtain, for a second sink statement in the code, a second set of influenced variables influenced by the first set of influenced variables,
add, to a trace graph, a plurality of nodes comprising:
a plurality of source nodes corresponding to the set of source variables,
a first plurality of influenced variable nodes corresponding to the first set of influenced variables, and
a second plurality of influenced variable nodes corresponding to the second set of influenced variables,
wherein each of the plurality of nodes comprises a location in the code,
add, to the trace graph, a first plurality of edges each connecting one of the plurality of source nodes and one of the first plurality of influenced variable nodes,
add, to the trace graph, a second plurality of edges each connecting one of the first plurality of influenced variable nodes and one of the second plurality of influenced variable nodes, and
report a defect trace comprising one of the first plurality of edges and one of the second plurality of edges.

10. The system of claim 7,
wherein the code further comprises:
(i) a first component comprising the first sink statement, and
(ii) a second component comprising a second sink statement,
wherein the second component has a size below a predetermined threshold, and
wherein the code analyzer is further configured to:
determine that a second source variable in the code receives a second source value from a second source function specified by the target analysis,
determine that a second source statement in the code writes, using the second source variable, the second source value to a cell in the column,
obtain, for the second sink statement:
a second set of influenced variables influenced by the second source variable, and
a second abstract state that assigns a second abstract value to each of the second set of influenced variables,
wherein the second sink statement reads the second source value into a second sink variable comprising an identifier of the cell,
add the second sink variable to the second set of influenced variables,
modify the second abstract state using the second sink statement, and
report a second defect at the second sink statement.

11. The system of claim 7, wherein the code analyzer is further configured to:
obtain, for a first statement in the code, a second abstract state and a set of variable dependencies each comprising a pair of variables, wherein at least one of the set of variable dependencies comprises a variable that corresponds to a cell in the column, and wherein the second abstract state assigns a second abstract value to each variable in each of the set of variable dependencies, and
modify, using the first statement, the set of variable dependencies and the second abstract state.

12. The system of claim 7, wherein the code analyzer is further configured to:
obtain, for a second sink statement in the code, a second sink variable influenced by the first sink variable, wherein the second sink variable reads the first source value,
add the second sink variable to the modified first set of influenced variables,
determine that the first source value is modified by a modifier function prior to the second sink variable accessing the first source value, and
in response to determining that the first source value is modified by the modifier function prior to the second sink variable accessing the first source value, report that a defect at the second sink statement was prevented.

13. A non-transitory computer readable medium comprising instructions that, when executed by a computer processor, perform:
determining that a first source variable in code receives a first source value from a first source function specified by a target analysis;
determining that a first source statement in the code writes, using the first source variable, the first source value to a column in a table;

obtaining, for a first sink statement in the code, a first set of influenced variables influenced by the first source variable;

determining that the first sink statement reads the first source value into a first sink variable comprising an identifier of the column and an identifier of a row in the table;

generating a modified first set of influenced variables by adding the first sink variable to the first set of influenced variables;

obtaining, for the first sink statement, a first abstract state that assigns a first abstract value to each of the first set of influenced variables;

modifying the first abstract state using the first sink statement; and reporting a first defect at the first sink statement.

14. The non-transitory computer readable medium of claim 13, further comprising instructions that perform:

obtaining, for a second sink statement in the code, a second sink variable influenced by the first sink variable, wherein the second sink variable reads the first source value;

adding the second sink variable to the modified first set of influenced variables; and reporting a second defect at the second sink statement.

15. The non-transitory computer readable medium of claim 13, wherein the first set of influenced variables is further influenced by a set of source variables, wherein the set of source variables comprises the first source variable, and wherein the instructions further perform:

obtaining, for a second sink statement in the code, a second set of influenced variables influenced by the first set of influenced variables;

adding, to a trace graph, a plurality of nodes comprising:
a plurality of source nodes corresponding to the set of source variables,
a first plurality of influenced variable nodes corresponding to the first set of influenced variables, and
a second plurality of influenced variable nodes corresponding to the second set of influenced variables,
wherein each of the plurality of nodes comprises a location in the code;

adding, to the trace graph, a first plurality of edges each connecting one of the plurality of source nodes and one of the first plurality of influenced variable nodes;

adding, to the trace graph, a second plurality of edges each connecting one of the first plurality of influenced variable nodes and one of the second plurality of influenced variable nodes; and reporting a defect trace comprising one of the first plurality of edges and one of the second plurality of edges.

16. The non-transitory computer readable medium of claim 13, wherein the code further comprises:
(i) a first component comprising the first sink statement, and
(ii) a second component comprising a second sink statement, wherein the second component has a size below a predetermined threshold, and wherein the instructions further perform:
determining that a second source variable in the code receives a second source value from a second source function specified by the target analysis;
determining that a second source statement in the code writes, using the second source variable, the second source value to a cell in the column;
obtaining, for the second sink statement:
a second set of influenced variables influenced by the second source variable, and
a second abstract state that assigns a second abstract value to each of the second set of influenced variables, and
wherein the second sink statement reads the second source value into a second sink variable comprising an identifier of the cell;
adding the second sink variable to the second set of influenced variables;
modifying the second abstract state using the second sink statement; and
reporting a second defect at the second sink statement.

17. The non-transitory computer readable medium of claim 13, further comprising instructions that perform:

obtaining, for a first statement in the code, a second abstract state and a set of variable dependencies each comprising a pair of variables, wherein at least one of the set of variable dependencies comprises a variable that corresponds to a cell in the column, and wherein the second abstract state assigns a second abstract value to each variable in each of the set of variable dependencies; and modifying, using the first statement, the set of variable dependencies and the second abstract state.

* * * * *